(12) United States Patent
Young

(10) Patent No.: US 8,725,599 B2
(45) Date of Patent: *May 13, 2014

(54) METHODS AND SYSTEMS FOR COLLABORATIVE DEMAND PLANNING AND REPLENISHMENT

(71) Applicant: WebConcepts, Inc., City of Industry, CA (US)

(72) Inventor: Raymond Young, West Covina, CA (US)

(73) Assignee: WebConcepts, Inc., Irving, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,139

(22) Filed: Oct. 12, 2012

(65) Prior Publication Data

US 2013/0041785 A1    Feb. 14, 2013

Related U.S. Application Data

(62) Division of application No. 10/932,672, filed on Sep. 1, 2004, now Pat. No. 8,355,944.

(60) Provisional application No. 60/500,425, filed on Sep. 4, 2003.

(51) Int. Cl.
*G06Q 10/00* (2012.01)
*G06Q 10/08* (2012.01)

(52) U.S. Cl.
USPC ............ 705/28; 705/22; 705/7.25; 705/7.31; 340/5.92; 235/385

(58) Field of Classification Search
None
See application file for complete search history.

(56) References Cited

U.S. PATENT DOCUMENTS

| | | | |
|---|---|---|---|
| 5,608,621 A | 3/1997 | Caveney et al. | |
| 5,920,261 A | 7/1999 | Hughes et al. | |
| 6,269,342 B1 | 7/2001 | Brick et al. | |
| 6,341,269 B1 | 1/2002 | Dulaney et al. | |
| 6,609,101 B1 * | 8/2003 | Landvater | 705/7.25 |
| 6,681,990 B2 * | 1/2004 | Vogler et al. | 235/385 |
| 7,092,929 B1 | 8/2006 | Dvorak et al. | |
| 7,222,786 B2 | 5/2007 | Renz et al. | |
| 7,480,623 B1 | 1/2009 | Landvater | |
| 7,480,629 B2 | 1/2009 | Dashefsky et al. | |

(Continued)

OTHER PUBLICATIONS

WebConcepts, Mar. 2004, wcisoft.com, http://web.archive.org/web/20040301035241/http://wcisoft.com/.*

(Continued)

*Primary Examiner* — Gurkanwaljit Singh
*Assistant Examiner* — Mehmet Yesildag
(74) *Attorney, Agent, or Firm* — Fish & Tsang LLP

(57) ABSTRACT

The present invention provides systems and methods for generating replenishment orders for products sold to a multi-store retailer. Store trait data is mapped with planogram information and the mapped data is used to generate a fixture level safety stock for a particular product in a particular store. The fixture level safety stock triggers fixture level replenishment orders.

19 Claims, 4 Drawing Sheets

(56) References Cited

U.S. PATENT DOCUMENTS

| | | |
|---|---|---|
| 2002/0010659 A1 | 1/2002 | Cruse et al. |
| 2002/0138324 A1* | 9/2002 | Zarefoss et al. ............... 705/8 |
| 2002/0147597 A1 | 10/2002 | Connors et al. |
| 2002/0169665 A1 | 11/2002 | Hughes et al. |
| 2002/0178074 A1 | 11/2002 | Bloom |
| 2003/0023503 A1 | 1/2003 | Alling |
| 2003/0033217 A1* | 2/2003 | Cutlip ........................... 705/27 |
| 2003/0078860 A1 | 4/2003 | Hoffman et al. |
| 2003/0083925 A1 | 5/2003 | Weaver et al. |
| 2003/0110104 A1* | 6/2003 | King et al. .................. 705/28 |
| 2003/0154141 A1* | 8/2003 | Capazario et al. ............ 705/27 |
| 2003/0182193 A1 | 9/2003 | Kawamata |
| 2003/0195791 A1 | 10/2003 | Waller et al. |
| 2003/0200129 A1 | 10/2003 | Klabauf et al. |
| 2003/0204480 A1* | 10/2003 | Heinrichs et al. ............. 707/1 |
| 2003/0216969 A1* | 11/2003 | Bauer et al. .................. 705/22 |
| 2004/0002912 A1 | 1/2004 | Colon et al. |
| 2004/0098296 A1 | 5/2004 | Bamberg et al. |
| 2004/0117243 A1 | 6/2004 | Chepil (Tony) |
| 2004/0162768 A1* | 8/2004 | Snyder et al. ................ 705/28 |
| 2004/0243487 A1 | 12/2004 | Tien et al. |
| 2005/0021561 A1 | 1/2005 | Noonan |
| 2005/0060246 A1* | 3/2005 | Lastinger et al. ............. 705/28 |
| 2005/0114235 A1* | 5/2005 | Snyder et al. ................ 705/28 |
| 2005/0256726 A1 | 11/2005 | Benson et al. |
| 2006/0080338 A1* | 4/2006 | Seubert et al. ............... 707/100 |

OTHER PUBLICATIONS

Dreze, Xavier, Stephen J. Hoch, and Mary E. Purk. "Shelf management and space elasticity." Journal of Retailing 70, No. 4 (1995): 301-326.*

Discount Store News, "Target's tech aids growth", Lebhar-Friedman Inc, Discount Store News 0.0: 99, Apr. 20, 1992.*

SAP, "SAP Retail Space MAnagement Interface", help.SAP.com, http://help.sap.com/printdocu/core/print46b/en/data/en/pdf/ISR/ISR_ALE_001.pdf, Dec. 1999.*

Kim, E., "Stochastic vendor managed replenishment with demand dependent shipment", European Journal of Operational Research, vol. 152, pp. 723-744, 2004.

"Recent Searches", ProQuest, http://proquest.umi.comJpqdweb?RQT=560&TS=123931 0990&clientld=19649, screen capture Apr. 9, 2009.

Salzarulo, P.A., "Vendor Managed Inventory Programs and Their Effect on Supply Chain Performance", Submitted to the faculty of the University Graduate School, Kelley School of Business, Indiana University, Aug. 2006.

Wang, Y. et al., "Supply Chain Coordination when Demand is Shelf-Space Dependent", Manufacturing and Service Operations Management, vol. 3, No. 1, pp. 82-87, Winter 2001.

* cited by examiner

US 8,725,599 B2

METHODS AND SYSTEMS FOR COLLABORATIVE DEMAND PLANNING AND REPLENISHMENT

This application is a divisional application of U.S. patent application Ser. No. 10/932,672 filed on Sep. 1, 2004 which claims the benefit of U.S. Provisional Application No. 60/500,425 filed on Sep. 4, 2003, all of which are incorporated herein by reference in their entirety.

FIELD OF THE INVENTION

The field of the invention is vendor managed inventory.

BACKGROUND OF THE INVENTION

Vendor managed inventory (VMI) systems generally allow product suppliers to manage inventory of product retailers. VMI systems first appeared in the 1980s with the goal of shifting some of the burden of product replenishment away from retailers and into the hands of the vendors. Early VMI systems used point of sale (POS) data to decrement an onhand quantity (i.e. perpetual inventory) until that decremented quantity dropped below a safety stock level. Once the quantity dropped below the safety stock level, an order was generated if economic order quantity restrictions were met.

Today, most large retailers do not stock excess inventory primarily because of high inventory carrying cost. As a result, it is particularly important that replenishment of items on shelves be sufficient to meet demand yet not be overly abundant so as to cause excess inventory. Ideally, there would be no excess inventory, but there would always be an item available to meet demand.

In attempting to meet this ideal, VMI systems examine sales data at the product level. This is problematic, however, because the demand for a particular product on a particular shelf can vary significantly among stores and even among shelves in the same store. In traditional VMI systems, suppliers had no visibility or insight into shelf level inventories in part because the information was not available, was too voluminous to handle, and was too dynamic. Thus, replenishment calculations often left too much inventory on some shelves and too little inventory on others. The problems were exacerbated by the fact that a particular item could sell well in one area of a store and poorly in another area of the same store.

SUMMARY OF THE INVENTION

The present invention provides systems and methods for generating replenishment orders for products sold to a multi-store retailer. Store trait data is mapped with planogram information and the mapped data is used to generate a fixture level safety stock for a particular product in a particular store. The fixture level safety stock triggers fixture level replenishment orders.

In another aspect, a vendor managed inventory (VMI) system comprises a remote server in communication over a public packet switched network with a local retailer system. The retailer system stores planogram information and store trait data which is received by the VMI system. The VMI system then maps the store trait data with planogram information in order to derive a fixture level safety stock for a particular product for a particular store. The safety stock is used as part of a trigger to generate replenishment orders.

Various objects, features, aspects and advantages of the present invention will become more apparent from the following detailed description of preferred embodiments of the invention, along with the accompanying drawings in which like numerals represent like components.

DETAILED DESCRIPTION

Figure 1:
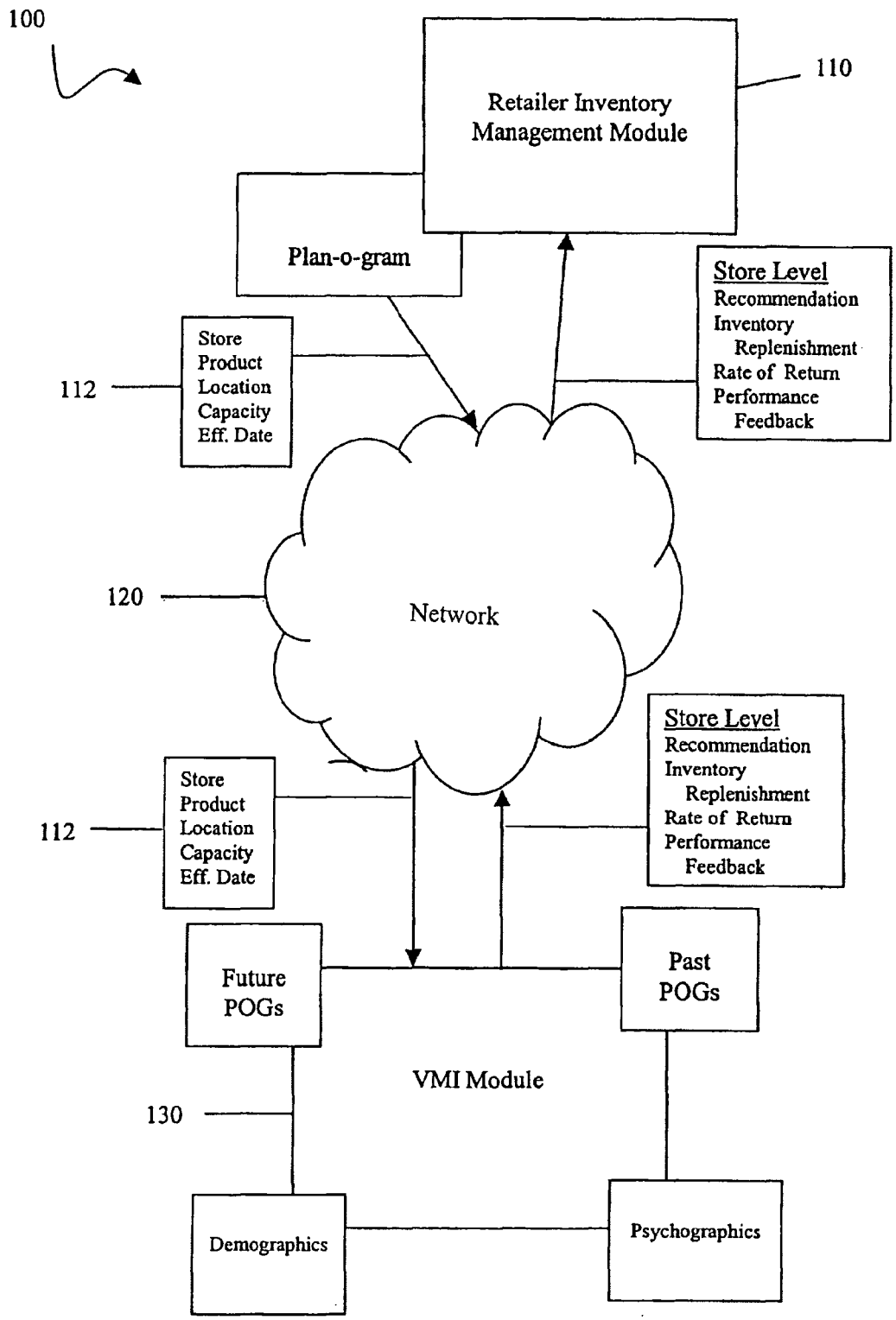
FIG. 1 is a schematic of a collaborative demand planning and replenishment (CDPR) system.

Referring to FIG. 1, a CDPR system 100 generally comprises a retailer inventory management module 110, a network 120, and a vendor managed inventory module 130.

Retailer inventory management module 110 includes on-hand inventory (perpetual inventory) amounts by product within shelf within store. Planograms are transmitted over a network 120 (e.g. the Internet) to a vendor managed inventory system (i.e. CDPR system). Preferably, files are transferred using file transfer protocol (FTP), however various other protocols and technologies can be used to transfer planogram data 112 including transfers using HTTP. It should also be recognized that all transmissions discussed herein can be accomplished using wired and/or wireless communication paths.

Figure 3:
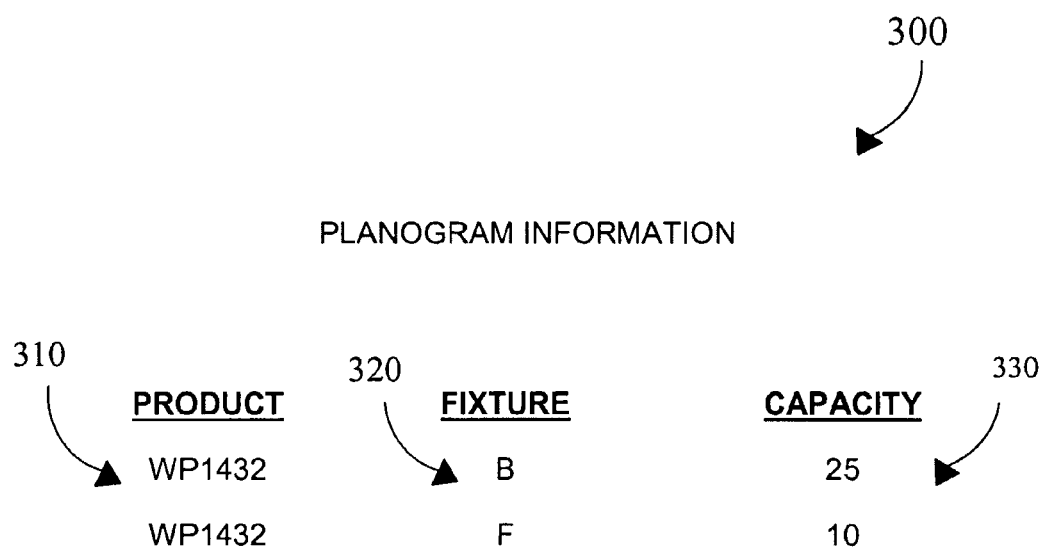
FIG. 3 is a planogram information listing.

Planograms are used by retailers and others to design and allocate shelf space in a store. A planogram is generally depicted graphically, but in any case typically includes the following information: product code, product vendor, fixture (i.e. location or shelf), fixture capacity, and effective date. FIG. 3 depicts some exemplary planogram information. Note, however, that planogram information does not include store identification.

For purposes of this specification, a fixture is the lowest level location of a product on a shelf. For example, if a retailer creates a planogram showing product configurations only to a shelf level of detail, the word "fixture" is synonymous with shelf. In fact, throughout much of this specification, the words fixture and shelf are interchangeable. However, if a shelf is further divided into multiple areas, a fixture is synonymous with a particular area on the shelf. Thus, a fixture is always the most detailed location of a product. It should be noted that shelf and/or fixture configurations generally remain consistent across all stores of a multi-store retailer.

Planogram information is generally entered by a retail level employee such as a merchandising manager. In most cases, the merchandising manager will derive planograms as a result of sales data, trends, and other dynamic information, and as such, planogram information can change very quickly. Not only can fixtures be added, deleted, and changed, but stores may open and close. All this adds to the dynamic nature of planograms. Because current planogram information is important to calculations made in a VMI system, it is contemplated that future (i.e. effective date in the future) as well as current planograms will be accepted and thereafter implemented based on the effective date. In addition, preferred embodiments will store historical planograms for use in analyzing particular store configurations. Performance data calculated at the vendor level is envisaged to be transmitted back to the retailer for input into store trait and planogram configurations.

The vendor managed inventory module 130 or CDPR module is generally controlled by a product provider (e.g. supplier, vendor, manufacturer, distributor, and so on), and the product provider is responsible for maintaining the data integrity and functional aspects of the system. In the context of this application, a vendor or product provider is an entity that provides a product that is directly or indirectly sold at a retail level.

The CDPR module uses the planogram information as well as other information including demographic, psychographic, and trend data to create forecasting data, rate of return data, performance data, and other outputs that are transmitted to the retail level inventory systems. Significantly, such information is used by the product provider to replenish inventory on a timely basis. It is the collaboration between the retail level system and the vendor level system that results in the exchange of valuable information. For example, the CDPR module is also capable of making recommendations to the retail level entity by taking into consideration past and future planogram information. These recommendations are generally contemplated to include factors that account for trends in product demand down to the store level or even the fixture level. Thus, a recommendation for one store will usually be different from that of another store because of demographic and psychogaphic differences. Moreover, recommendations can vary depending on the location of a fixture in a store.

Past, current, and future planogram information is accepted by the VMI module. As such, the effective date of a planogram is important. A store may, for instance, transmit a series of planograms having successive effective dates as well as varying capacities, locations, and so on. The CDPR module is receptive to multiple planograms and can even accept and incorporate changes to planograms in a real-time manner.

Figure 2:
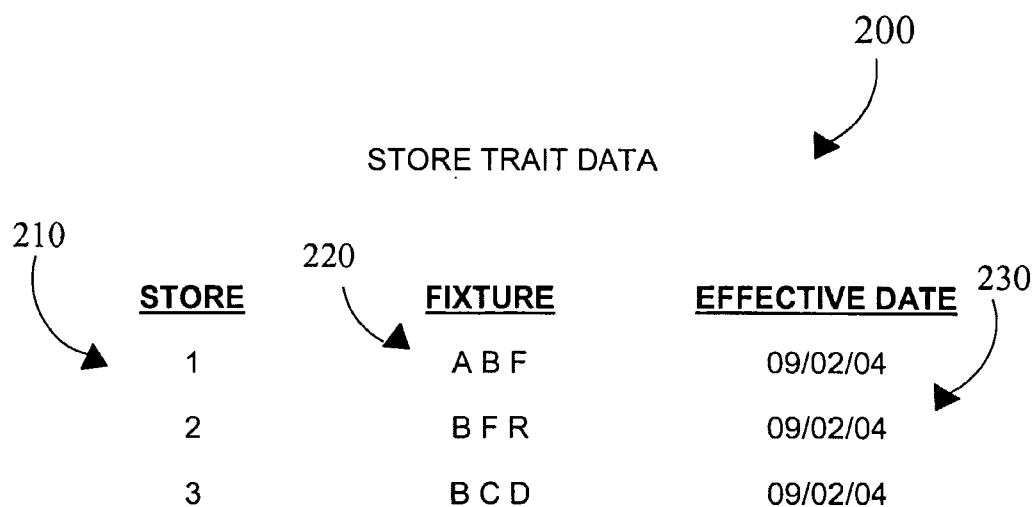
FIG. 2 is a store trait data listing.

Drawing your attention now to FIG. 2, a store trait data listing 200 generally includes the following fields: store identification 210 (e.g., store number), fixture 220, and effective date 230. Store trait data basically represents the configuration of a store in terms of its fixtures. It should be noted that a multi-store retailer has stores that are divided up into fixtures; so, for example, store 1 has fixtures A, B, and F. Obviously, FIG. 2 shows exemplary data and many more fixtures would likely be included in most retail stores. Still, with reference to FIG. 2, one can see that fixtures B and F are part of the configuration of stores 1 and 2 and fixture B is part of the configuration of store 3.

FIG. 3 depicts planogram information 300 including fields for product code 310, fixture 320, and fixture capacity 330. Focusing on FIG. 3, one can see that the capacity for item WP1432 is 25 on fixture B and 10 on fixture F.

Figure 4:
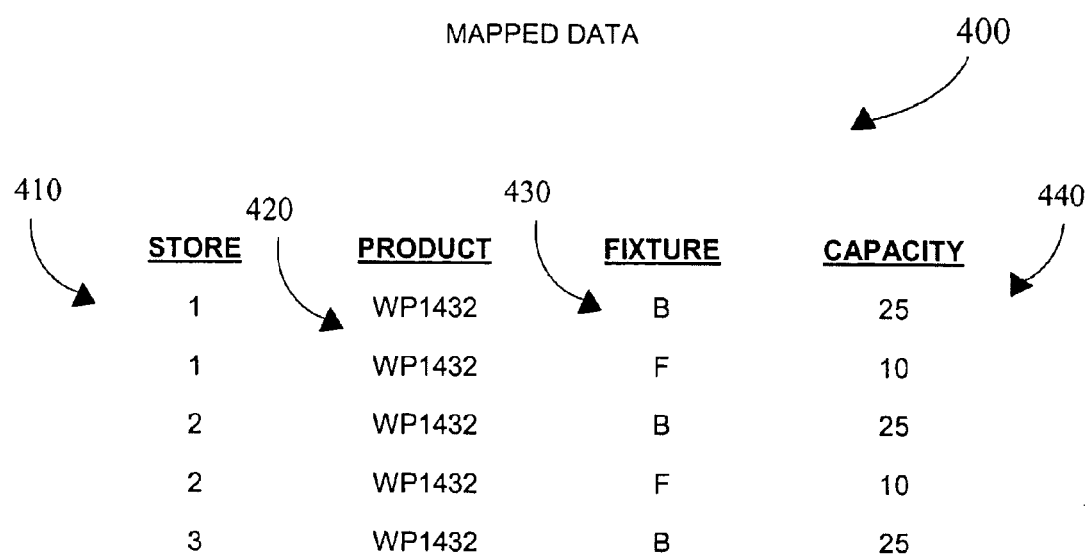
FIG. 4 is a listing of mapped planogram information and store trait data.

In FIG. 4, a listing of mapped data 400 includes store identification 410, product code 420, fixture 430, and fixture capacity 440. Of course, other fields such as effective data may be included in a listing of mapped data, though not depicted for purposes of FIG. 4. It is contemplated that mapping includes a step of matching store trait data and planogram information by fixture identifier. Using the mapped data, it becomes clear that stores 1 and 2 require 35 WP1432 while store 3 requires only 25. It should be recognized that because capacities are at the fixture level, safety stock and replenishment amounts can be calculated by fixture thereby reducing the incidence of excess or insufficient inventory and at the same time increasing good will toward the retailer.

Figure 5:
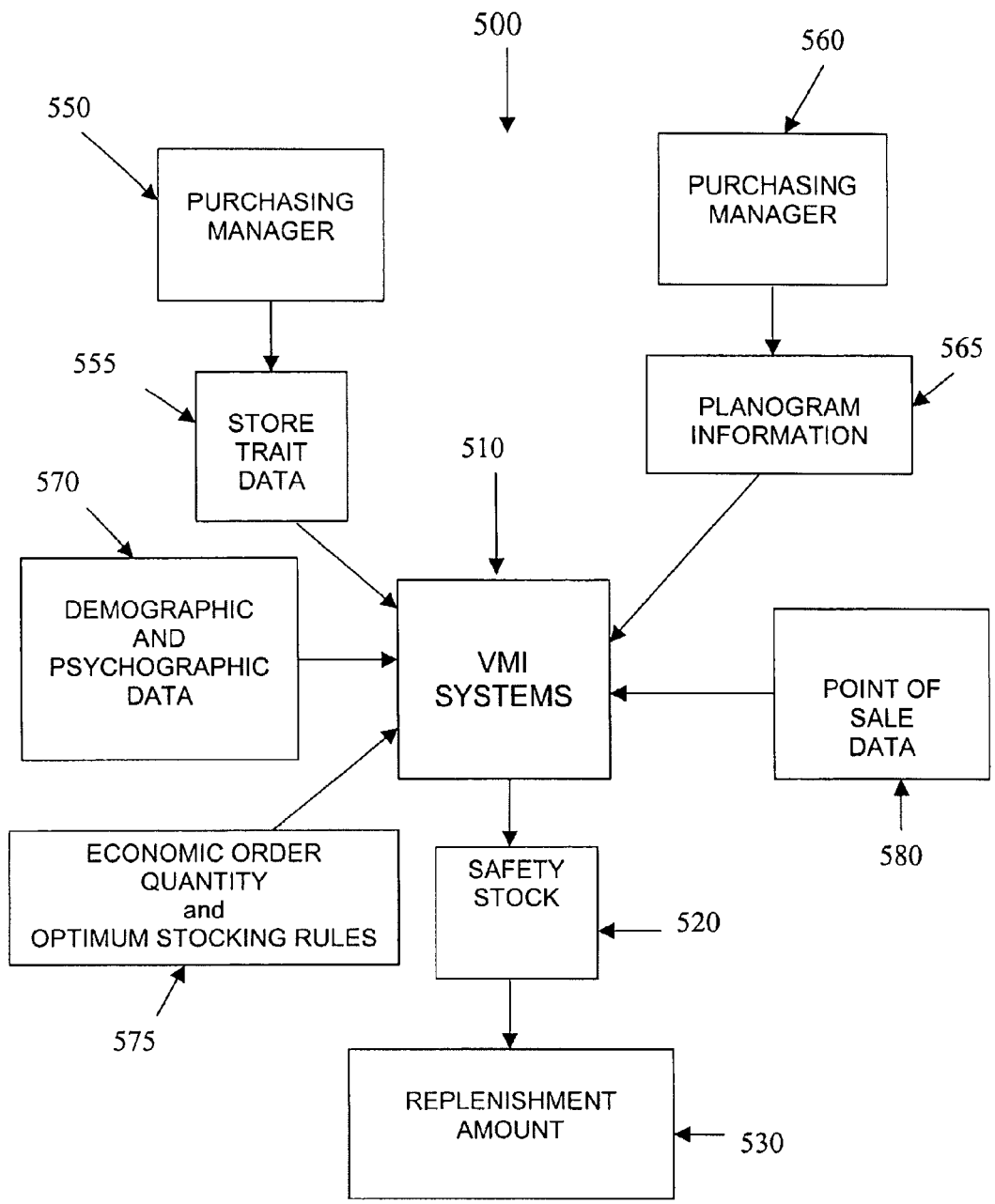
FIG. 5 is a schematic of a safety stock and replenishment calculation system.

Now, with regard to FIG. 5, a safety stock and replenishment calculation system 500 generally comprises a VMI system 510 that calculates a safety stock 520 which, in turn, is input to a replenishment amount 530.

A purchasing manager 550 uses store sales figures, trends, demographics, psychographics, and so on to determine a fixture configuration for a store. It should be recognized that a purchasing manager is not required as there are other entities and automated methods that can be used to determine fixture configurations. In any case, fixture configuration by store is reflected in the store trait data 555.

On the other side of the equation, a merchandising manager 560 creates planogram information 565 based on product information as well as sales information, space limitations, and store layouts. Again, another entity or automated method may be substituted for a merchandising manager in less preferred embodiments.

Both the store trait data 555 and planogram information 565 are input to the vendor managed inventory system 510. It is contemplated that transmission of store trait data and planogram information may utilize various channels of communication including most especially those that use the Internet. As planogram information and store trait data is often in a spread sheet format (e.g. Microsoft® Excel), a preferred VMI system allows for import of such files formats.

VMI system 510 receives demographic data and psychogaphic data 570 including ages, incomes, socio-economic data and so on. Such demographic and psychogaphic data can be applied to the capacity for a product before selecting a safety stock value. VMI system 510 also receives information which enables it to calculate economic order quantity (EOQ) rules 575. One of skill in the art will recognize that EOQ rules may take into consideration lead times and economic order quantities in addition to other information.

VMI system 510 also receives point of sale data 580 preferably including fixture level sales data. Point of sale data 580 includes product id, store number, and quantity sold and may also include perpetual inventory amounts and a fixture identification, though the latter two items of data are not included in some embodiments. In a preferred class of embodiments, fixture level point of sales (POS) data is applied to current fixture level capacity which was received as part of the planogram information. It should be pointed out here that in most cases, current fixture level capacity is based on the effective date that was also received as part of the planogram information. Collecting point of sale data at a fixture level is generally accomplished by affixing a fixture identifier on or in each product. Preferably the fixture level identifier is in the form of an RFID chip which is read by the point of sale system in order to indicate a sale of a product from a particular fixture.

A further aspect of the inventive matter is the inclusion of POS data to the day of the week. The following example, based on the data in FIG. 4, elucidates this aspect. Store 1 has capacity of 25 for product WP1432 on fixture B. Assume that a safety stock of 13 was calculated based on the inventive concepts provided herein. When the perpetual quantity of WP1432 on fixture B in store 1 dips below 13, generation of a fixture level replenishment order is triggered. If the replenishment order is generated on a Thursday and the lead time is 3 days, the VMI system is advantageously programmed to look at fixture level sales history for the days of Friday, Saturday, and Sunday when calculating the quantity of WP1432 to send in the replenishment order. This aspect is important because sales for the days of Friday, Saturday, and Sunday may far exceed sales of the days of Monday, Tuesday, and Wednesday, for instance.

It should be stressed that planogram information and store trait data are continuously being monitored by the VMI system and in that regard when an effective date becomes equal to the current date, the new planogram information and/or store trait data are put into effect.

Thus, specific embodiments and applications of a collaborative demand planning and replenishment system have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A vendor managed inventory system that manages inventory across stores of a retailer, the system comprising:
   a retailer network interface configured to communicate with the retailer over a network; and
   a vendor management inventory server communicatively coupled with the retailer via the network interface and configured to:
      receive store-level trait information comprising at least one store identifier, each of the at least one store identifier corresponding to a store and a set of fixture identifiers associated with each of the at least one store identifier, wherein each fixture identifier within the set of fixture identifiers corresponds to a fixture within the store;
      receive retailer planogram information comprising a product identifier corresponding to a product, at least one fixture identifier corresponding to a respective fixture associated with the product, and a product capacity associated with each of the at least one fixture identifier, corresponding to the capacity of product for the respective fixture;
      generate store-level mapped data by matching at least one fixture identifier from the retailer planogram information with a corresponding at least one fixture identifier from the set of fixture identifiers;
      determine a replenishment level for a product based on the store-level mapped data; and
      trigger a replenishment order when a safety stock level of the product falls below the replenishment level.

2. The system of claim 1, wherein the planogram information lacks store identifier information.

3. The system of claim 1, wherein the planogram information includes a product vendor.

4. The system of claim 1, wherein the store trait information further comprises a plurality of store identifiers corresponding to a respective plurality of stores of a multi-store retailer.

5. The system of claim 4, the replenishment levels for the product at one of the stores is different from that of another one of the stores.

6. The system of claim 1, wherein the store trait information further includes demographic information and where the replenishment levels depend at least in part on the demographic information.

7. The system of claim 1, wherein the store trait information further includes psychographic information where the replenishment levels depend at least in part on the psychographic information.

8. The system of claim 1, wherein the vendor managed inventory server is further configured to determine the replenishment levels with respect to a week at least in part as a function of a day of the week.

9. The system of claim 3, wherein the vendor managed inventory server is further configured to determine the replenishment levels at least in part as a function of a specific future date.

10. The system of claim 1, wherein the vendor managed inventory server is further configured to determine the replenishment levels at least in part as a function of a historic trend in product demand.

11. The system of claim 1, wherein the vendor managed inventory server is further configured to determine the replenishment levels at least in part as a function of an expected trend in product demand.

12. The system of claim 1, wherein the vendor managed inventory server is further configured to determine replenishment levels based on analyzing fixture level point of sale data from the store.

13. The system of claim 1, wherein at least one of the store-level trait information and the planogram information further comprises an effective date.

14. The system of claim 13, wherein the store-level mapped data is generated based on the effective date.

15. The system of claim 13, wherein the store-level mapped data is updated when the effective date equals a current date.

16. The system of claim 1, wherein the planogram information comprises a plurality of effective dates.

17. The system of claim 10, wherein the vendor managed inventory server is further configured to transmit the historic trend to the retailer.

18. The system of claim 1, wherein the retailer planogram information further includes a second fixture identifier, and wherein the store-level mapped data is generated by also matching the second fixture identifier with a part of the set of fixture identifiers.

19. The system of claim 1, wherein the retailer planogram information associates the same product identifier with the first fixture identifier and the second fixture identifier.

* * * * *